Patented Apr. 9, 1940

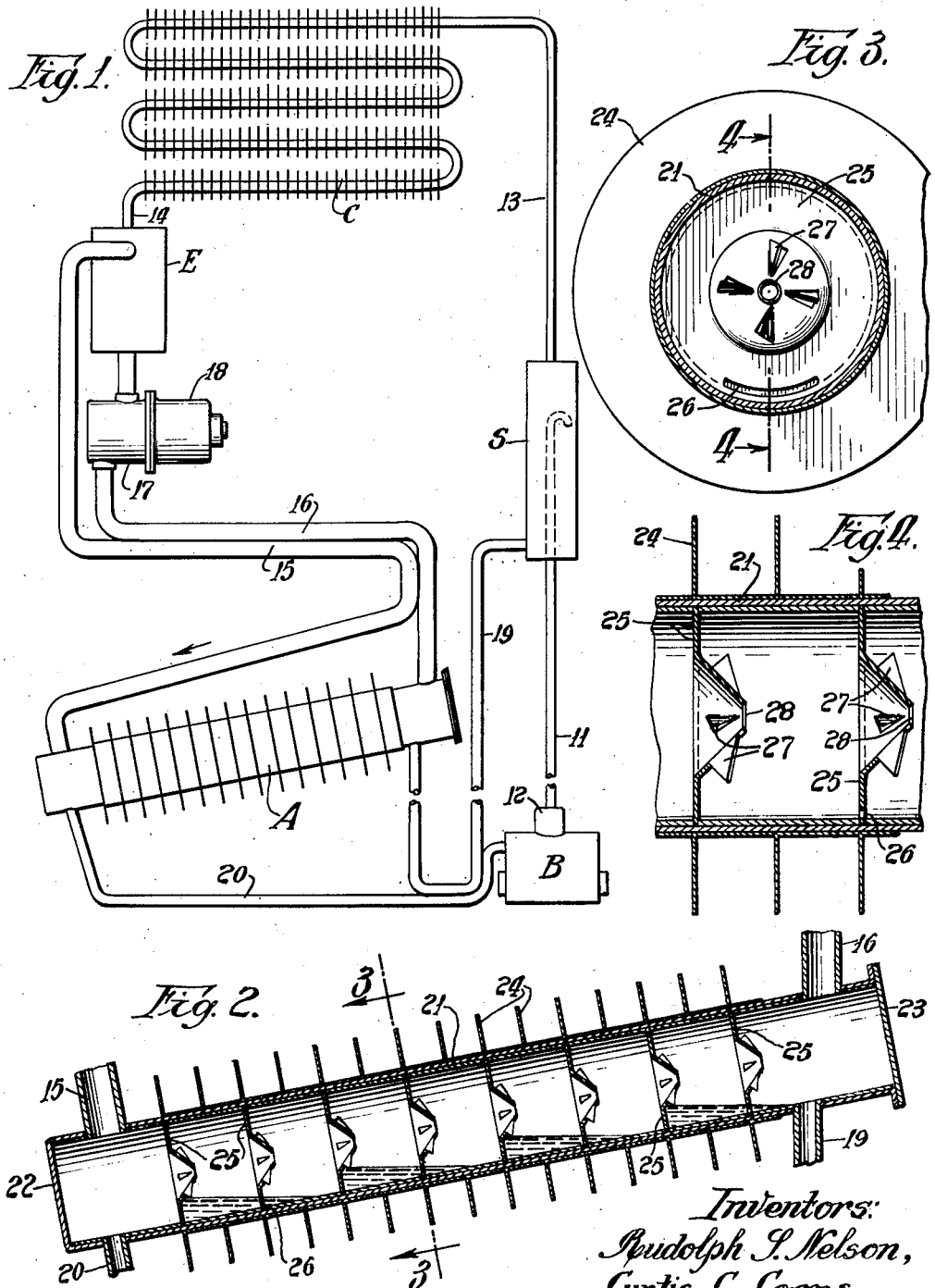

2,196,707

UNITED STATES PATENT OFFICE 2,196,707

ABSORBER FOR REFRIGERATING SYSTEMS

Rudolph S. Nelson, Larchmont, N. Y., and Curtis C. Coons, North Canton, Ohio, assignors to The Hoover Company, North Canton, Ohio, a corporation of Ohio Application August 8, 1936, Serial No. 94,932
Renewed November 13, 1937

11 Claims. (Cl. 261—119)

This invention relates to continuous absorption refrigerating systems and more particularly to absorbers adapted for use therein.

The present invention relates particularly to absorption refrigerating systems of the type utilizing an inert gas which traverses a circuit including an evaporator and an absorber. The inert gas may circulate by the density differential existing between lean warm gas leaving the absorber and the cold rich gas leaving the evaporator or it may be circulated by means of a power driven device such as a circulating fan.

It is an object of the present invention to provide an absorber adapted for use in such a system and in which the inert gas, the gas to be absorbed and the absorption liquid are brought into intimate contact without the use of mechanically moving parts within the absorber itself.

It is another object of the invention to aid in transferring heat from the fluids within the absorber to some external cooling means by imparting a peculiar motion to the fluids within the absorber vessel.

Other objects and advantages reside in certain novel features of the arrangement and construction of parts as will be apparent from the following description taken in connection with the accompanying drawing in which Figure 1 is a diagrammatic representation of a continuous absorption refrigerating system having an absorber constructed in accordance with the present invention incorporated therein.

Figure 2 is a longitudinal cross-sectional view somewhat enlarged of the absorber shown in Figure 1.

Figure 3 is a transverse cross-sectional view of the absorber of Figure 2, the view being taken on the line 3—3 thereof and Figure 4 is a further enlargement of a fragmentary portion of the absorber shown in Figure 2, the view being a cross-section taken on the line 4—4 of Figure 3.

Referring to the drawing in detail and first to the diagram of Figure 1 it will be seen that a continuous absorption refrigerating system is illustrated as consisting of a boiler B, a rectifier S, a condenser C, and evaporator E and an absorber A, these parts being connected by various conduits to form the complete refrigerating system.

A gas lift pump conduit 11 is connected to the dome 12 of the boiler proper and conveys gas and liquid from the boiler into the gas separation chamber S in accordance with known practice. The top of the gas separation chamber S is connected to the top of the condenser by means of a refrigerant conduit 13. Refrigerant condensing in the condenser C is drained into the evaporator through a conduit 14. The evaporator is connected to the absorber by means of two inert gas conduits 15 and 16 which may have portions in heat exchange relation. The inert gas conduit 15 connects the top of the evaporator to the bottom of the absorber, and the inert gas conduit 16 connects the bottom of the evaporator to the top of the absorber.

Located at some convenient point within the inert gas conduit 16 is an electrically operated fan which causes the inert gas to circulate. This is shown at 17. The fan may be driven by an electric motor 18 which may be hermetically sealed to the system in accordance with known practice.

For circulating absorption liquid between the boiler and the absorber a conduit 19 connects the bottom of the gas separation chamber S to the top of the absorber and a conduit 20 connects the bottom of the absorber to the boiler B. It will be understood that absorption liquid is lifted from the boiler B into the gas separation chamber S by means of the gas lift pump 11 and that it flows by gravity from the gas separation chamber through the conduit 19, then downwardly through the absorber by gravity and back to the boiler through the conduit 20.

At the same time the inert gas is circulated in a local circuit between the evaporator and the absorber through the conduit 15. This stream of inert gas carries refrigerant evaporating in the evaporator through the conduit 15 and into the absorber where the refrigerant is absorbed by the absorption liquid.

The present invention relates to the construction of the absorber which is shown in detail in Figures 2, 3 and 4.

As there shown this device consists of a cylindrical vessel made of seamless steel tubing or the like which is designated 21. The cylinder 21 is disposed in a slightly inclined position as illustrated and is provided with end plates 22 and 23. Heat radiating fins 24 may be secured to the outside of the absorber vessel to aid in transferring heat therefrom to the atmosphere.

An important feature of the present invention is the construction of the internal baffle plates 25 in the absorber vessel 21. As best shown in Figures 3 and 4 these baffle plates 25 are disposed in planes substantially at right angles to the longitudinal axis of the cylinder 21 and have central openings provided with vanes of a peculiar construction. Alternate baffle plates 25 have openings or slots along their lower edge as shown at 26.

The baffle plates which do not have the slot 26 therein act as dams or weirs to maintain a number of pools of liquid along the lower side of the absorber vessel 21. The baffle plates 25 which do have slots therein do not function to maintain liquid levels, but do aid the baffles in causing the peculiar motion of the gases in the absorber vessel which will now be described.

Each of the baffle plates 25 within the absorber is provided with a number of vanes 27 disposed about the central opening 28 therein. As shown in Figures 3 and 4, in forming the vanes the baffle plates 25 are also formed into cups or concave portions and the vanes 27 are struck out from the cupped portions thereof. Each vane 27 is formed by cutting the metal in the cup of the plate 25 along a radial line and along a chord of the circle described by the periphery of the cup. The metal is then bent out, to the right as viewed in Figure 4, along a second radius connecting the inner end of the radius along which the metal is cut and the other end of the chord. In other words, the metal is bent along a line opposite to the angle formed in cutting the metal to form the vane.

As shown in Figures 3 and 4 the vanes 27 are therefore disposed at angles somewhat similar to the angles of a wind mill or fan so that as gas is circulated through the absorber by means of the gas circulator 17 a spiral or whirling motion will be set up throughout the entire length of the absorber.

This whirling movement of the gases brings them in intimate contact with the pools of liquid formed along the lower portion of the absorber and aids in transferring heat from these pools to the exterior of the absorber as well as causing the refrigerant gas to be readily absorbed thereby.

Another advantage in the arrangement illustrated is that absorption liquid as it trickles downwardly through the absorber passes through the slot 26 in such a way that the weak aqua constantly mixes with the strong aqua floating on the top of the pool. It will be noted that the slots 26 are in such a position that the weak aqua is removed from the bottom of the pool above the baffle plate in which they are located. This weak aqua mixes with the strong aqua below the baffle plate containing the slot 26 and aids in causing quick absorption of the refrigerant gases.

It is, of course, possible to employ the absorber illustrated in an arrangement in which the inert gas is circulated between the evaporator and the absorber by gravity or by means other than the particular gas circulator shown. Various other changes may be made without departing from the spirit of the invention or the scope of the annexed claims.

We claim:

1. An absorber adapted for use in a continuous absorption refrigerating system using inert gas, which comprises a vessel disposed in a slightly inclined position and baffle plates in said vessel adapted to cause the formation of pools of liquid along the lower side of said vessel, said baffle plates having means thereon for causing gases supplied to said vessel to pass therethrough in spiral motion and come into intimate contact with the pools of liquid.

2. An absorber adapted for use in a continuous absorption refrigerating system using inert gas, which comprises a vessel disposed in a slightly inclined position and baffle plates in said vessel adapted to cause the formation of pools of liquid along the lower side of said vessel, said baffle plates having means thereon for causing gases supplied to said vessel to pass therethrough in spiral motion and come into intimate contact with the pools of liquid, the means which causes the gas to move with a spiral motion consisting of vanes struck up upon said baffles.

3. An absorber adapted for use in a continuous absorption refrigerating system using inert gas, which comprises a vessel disposed in a slightly inclined position and baffle plates in said vessel adapted to cause the formation of pools of liquid along the lower side of said vessel, said baffle plates having means thereon for causing gases supplied to said vessel to pass therethrough in spiral motion and come into intimate contact with the pools of liquid, alternate of said baffles having slots near the lower edge thereof.

4. In a continuous absorption refrigerating system the combination of a vessel disposed in an inclined position, means for supplying absorption liquid to the top of said vessel and for removing absorption liquid from the bottom thereof, power driven means for circulating gases through said vessel and means within said vessel for causing the gases to flow in a spiral path and come into intimate contact with the absorption liquid at a plurality of places.

5. In a continuous absorption refrigerating system the combination of a vessel disposed in an inclined position, means for supplying absorption liquid to the top of said vessel and for removing absorption liquid from the bottom thereof, power driven means for circulating gases through said vessel and means within said vessel for causing the gases to flow in a spiral path and come into intimate contact with the absorption liquid at a plurality of places, said last mentioned means including a number of baffles for forming pools of liquid and vanes for directing the gases against the surfaces of the pools.

6. Absorption refrigerating apparatus comprising an absorber conduit, a plurality of air-cooling fins on the exterior of said vessel, and means within said vessel for forming a plurality of liquid pools, means for flowing the liquid in the bottom of one portion of each pool to the surface of another portion of such pool, means for periodically imparting a swirling motion to a gas to be absorbed flowing through the conduit, the arrangement being such that the liquid flows from pool to pool in contact with the gas stream.

7. In an absorption refrigerating system the combination of a vessel disposed in an inclined position, means for supplying absorption liquid to the upper end of said vessel and for removing absorption liquid from the lower end thereof, means for circulating gases through said vessel, and means within said vessel for causing the gases to flow in a spiral path and come into intimate contact with the absorption liquid at a plurality of points, said last mentioned means including means for obstructing the flow of the absorption liquid through said vessel to improve the gas and liquid contact.

8. In an absorption refrigerating system the combination of a vessel disposed in an inclined position, means for supplying absorption liquid to the upper end of said vessel and for removing absorption liquid from the lower end thereof, means for circulating gases through said vessel, and means within said vessel for causing the gases to flow in a spiral path and come into intimate contact with the absorption liquid at a plurality of points, said last mentioned means including means for obstructing the flow of absorption liquid through said vessel to form collected bodies of the liquid and to interpose less resistance to the flow of the liquid along the bottom wall of the vessel than to the liquid adjacent the surface of the collected bodies thereof.

9. Absorption refrigerating apparatus including an absorber, means for conducting a pressure equalizing medium and a medium to be absorbed to and away from said absorber, means for conveying an absorbing medium to and away from said absorber, said absorber comprising an inclined conduit, means within said conduit having portions contacting the bottom of the conduit to form pools of the absorbing solution and other portions arranged to impart a swirling motion to the pressure equalizing medium and medium to be absorbed flowing across the surfaces of the pools.

10. Absorption refrigerating apparatus including an absorber, means for conducting a pressure equalizing medium and a medium to be absorbed to and away from said absorber, means for conveying an absorbing medium to and away from said absorber, said absorber comprising an inclined conduit, means within said conduit having portions contacting the bottom of said conduit to form pools of the absorbing solution and other portions within the conduit arranged to direct said pressure equalizing medium at angles to the axis of said conduit and against the surfaces of said pools, certain of the portions of said means contacting the bottom portion of said conduit being constructed to allow flow of the absorbing medium thereby along the bottom portion of said conduit.

11. Absorption refrigeration apparatus comprising an elongated finned conduit, means for circulating a mixture of a pressure equalizing medium and a medium to be absorbed through said conduit, means for supplying an absorbing medium to said conduit, means for removing the absorbing medium and absorbed medium from said conduit, a baffle element in said conduit having a portion thereof in discontinuous contact with the lower wall of said conduit to restrict the flow of the solution thereby to a thin stream directly on the lower wall of said conduit, and another portion extending into the upper portion of said conduit formed to impart a twisting motion to the stream of the mixture of pressure equalizing medium and medium to be absorbed flowing therethrough.

RUDOLPH S. NELSON.
CURTIS C. COONS.

CERTIFICATE OF CORRECTION.

Patent No. 2,196,707. April 9, 1940.

RUDOLPH S. NELSON, ET AL.

It is hereby certified that error appears in the printed specification of the above numbered patent requiring correction as follows: Page 2, second column, lines 45 and 46, claim 6, for the word "vessel" read --conduit--; and that the said Letters Patent should be read with this correction therein that the same may conform to the record of the case in the Patent Office.

Signed and sealed this 4th day of June, A. D. 1940.

(Seal)

Henry Van Arsdale,
Acting Commissioner of Patents.